(12) United States Patent
Walker et al.

(10) Patent No.: US 8,792,873 B2
(45) Date of Patent: Jul. 29, 2014

(54) SELF-CONFIGURATION OF WIRELESS NETWORKS

(71) Applicant: Ubiquisys Limited, Swindon (GB)

(72) Inventors: Mark Walker, Wiltshire (GB); Charlotte Baden, Wiltshire (GB); Tim Robinson, Berkshire (GB)

(73) Assignee: Ubiquisys Limited, Swindon (GB)

( * ) Notice: Subject to any disclaimer, the term of this patent is extended or adjusted under 35 U.S.C. 154(b) by 2 days.

(21) Appl. No.: 13/685,256

(22) Filed: Nov. 26, 2012

(65) Prior Publication Data

US 2014/0134991 A1    May 15, 2014

(30) Foreign Application Priority Data

Nov. 14, 2012  (GB) .................................. 1220496.2

(51) Int. Cl.
*H04M 3/00* (2006.01)
*H04W 8/22* (2009.01)
(52) U.S. Cl.
CPC ...................................... *H04W 8/22* (2013.01)
USPC .......................................... 455/418; 370/252
(58) Field of Classification Search
None
See application file for complete search history.

(56) References Cited

U.S. PATENT DOCUMENTS

| | | | | |
|---|---|---|---|---|
| 2010/0261467 A1* | 10/2010 | Chou et al. | ................. | 455/422.1 |
| 2011/0105139 A1 | 5/2011 | On | | |
| 2012/0063338 A1* | 3/2012 | Elliott et al. | ................. | 370/252 |
| 2012/0106370 A1* | 5/2012 | Radulescu et al. | ............ | 370/252 |
| 2012/0149353 A1 | 6/2012 | Helfrich | | |

FOREIGN PATENT DOCUMENTS

| | | |
|---|---|---|
| GB | 2447439 A | 8/2011 |
| GB | 2472597 B | 5/2012 |
| WO | WO2010/028702 | 3/2010 |
| WO | WO2011/022626 | 2/2011 |
| WO | WO2011/133195 | 10/2011 |

OTHER PUBLICATIONS

UK Search Report dated Apr. 22, 2013 for GB Application No. 1220496.2.

* cited by examiner

*Primary Examiner* — Erika A Washington
(74) *Attorney, Agent, or Firm* — Weaver Austin Villeneuve & Sampson LLP

(57) ABSTRACT

A cellular communications network includes multiple base stations. In order for the network to provide the best possible coverage for users, it is necessary for the radio configuration of each base station to take into consideration the radio configurations of nearby base stations. Operational context information for the access point is transmitted according to a publish-subscribe messaging pattern. Information is received identifying at least one other access point meeting proximity criteria. The access point subscribes to publish-subscribe messages from the or each other access point identified in said information, and sets its radio configuration information in view of the received messages from the or each other access point.

6 Claims, 4 Drawing Sheets

SELF-CONFIGURATION OF WIRELESS NETWORKS

FIELD OF THE INVENTION

This invention relates to wireless communications networks, and in particular to a method of self-configuration of such a network.

BACKGROUND

A cellular communications network includes multiple base stations. In order for the network to provide the best possible coverage for users, it is necessary for the radio configuration of each base station to take into consideration the radio configurations of nearby base stations. For example, the downlink power with which each base station transmits signals needs to take into account the downlink powers used by nearby base stations, in order to ensure that there is adequate network coverage, without causing problems due to interference.

Traditionally, the radio configuration of cellular networks is manually planned, and explicitly provisioned from the network to a macrolayer NodeB. As a development of this, as disclosed in GB-2447439A, standalone femtocell base stations can instead be provisioned with a range of possible values for their radio configuration, and can then choose an optimal configuration autonomously. In addition, GB-2472597 discloses a femtocell base station that is intended to form part of a group of base stations that can be deployed in an enterprise such as a large office, a shopping mall, a campus, or the like. In this solution, small groups of femtocell base stations that are connected to the same local area network (LAN) may autonomously reach a collective radio configuration by broadcasting their own selected configuration to all their peers, and then adjusting their own configuration based on the configurations of their peers that they receive.

However, this has the limitation that the femtocells must all be connected to the same local area network, so that they can communicate by broadcasting (or multicasting their configuration information messages). Moreover, in the case of a large deployment of small cells, there is the disadvantage that every femtocell basestation must handle signalling traffic from every other femtocell basestation.

SUMMARY

According to an aspect of the present invention, there is provided a method of configuring an access point, the method comprising:
  transmitting operational context information for the access point according to a publish-subscribe messaging pattern;
  receiving information identifying at least one other access point meeting proximity criteria;
  subscribing to publish-subscribe messages from the or each other access point identified in said information; and
  setting radio configuration information for the access point in view of the received messages from the or each other access point.

According to a second aspect of the present invention, there is provided an access point, configured to operate in accordance with the method of the first aspect According to a third aspect of the present invention, there is provided a computer program product, comprising computer readable code for causing a processor to operate in accordance with the method of the first aspect.

According to a fourth aspect of the present invention, there is provided a network node for a telecommunications network, the network node being configured:
  to receive information from each of a plurality of access points,
  to determine on the basis of said information which of said access points have coverage areas that overlap, and,
  for each pair of access points with overlapping coverage areas, to notify the access points of the overlap.

This has the advantage that large numbers of small cells can be deployed without requiring the mobile network operator to incur the large operational expenditure that would be involved in extensive network planning, and without requiring each basestation to process messages from every other basestation.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Figure 1:
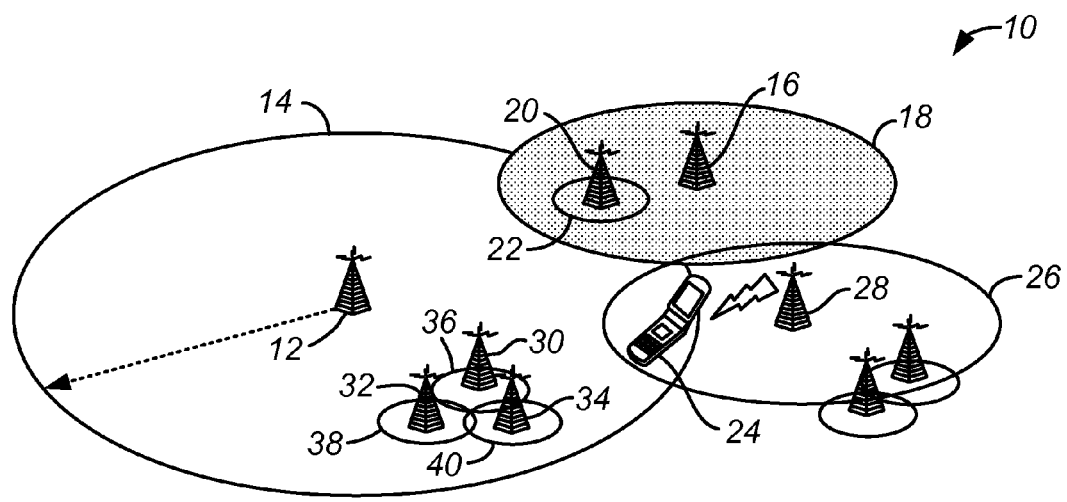
FIG. 1 illustrates a wireless communications network in accordance with an embodiment of the invention.

FIG. 1 illustrates the general form of a part of a wireless communications network 10. At this level of generality, the network 10 is conventional, and so it is described here only to the extent required for an understanding of the present invention.

The invention is described here with reference to a cellular wireless communications network, for example a Universal Mobile Telecommunications System (UMTS) Terrestrial Radio Access Network (UTRAN). However, it will be appreciated that the invention is applicable to other types of network.

The network 10 includes multiple access points, for example in the form of cellular base stations. Each access points is a radio transmit/receive station, having a specific location, and transmitting at a specific power in a specific part of the radio spectrum. Depending on the cellular radio technology that is used by the network, the spectrum might be divided by frequency, timeslot and/or code.

FIG. 1 shows an access point 12, which has the potential to provide coverage in a cell, namely an area bounded by the line 14. Each access point serves a cell in this way. The exact size of each cell will be determined by the presence of any obstacles such as tall buildings and the like. However, in general terms the size of the cell can be regarded as a function of the transmit power with which the access point broadcasts its signals.

A network operator will typically install a number of base stations that is sufficient to provide coverage throughout the intended coverage area. These base stations each serve relatively large cells. There is a limit to the number of calls that can be handled by an access point any time, and so additional access points can then be deployed in areas of high user density.

For example, FIG. 1 shows a base station 16 serving a cell 18. If the network operator is able to predict that there will be a high level of traffic at a particular location within the cell 18, for example at a railway station, then an additional base station 20 can be installed to serve a cell 22 that covers that location.

A user equipment (UE) device, such as the mobile phone 24, obtains network service by radio contact with an access point. For example, FIG. 1 shows the mobile phone 24 being within the cell 14, but also being within a cell 26 being served by an access point 28. Thus, the UE could make radio contact with the access point 12 or the access point 28, and the protocols used by the Radio Access Network define mechanisms that determine which access point should serve the UE. In general terms, the access point that is best able to serve the UE is the access point that has the strongest signal. Service to a UE is maintained by changing the serving access point as the user equipment moves within the region.

In larger areas of high user density, multiple small cells can be deployed, either at the instigation of the mobile network operator, or of the management of a campus, shopping mall, large office building, or the like. Thus, FIG. 1 shows three access points 30, 32, 34, serving respective small cells 36, 38, 40, within the cell 14.

In order to provide service to UEs throughout a region, the access points must have transmit power and spectrum configurations which maximise coverage while avoiding interference. There are typically a small number of available spectrum choices, so coverage areas must be adjusted such that no coverage areas with the same spectrum assignment overlap.

Figure 2:
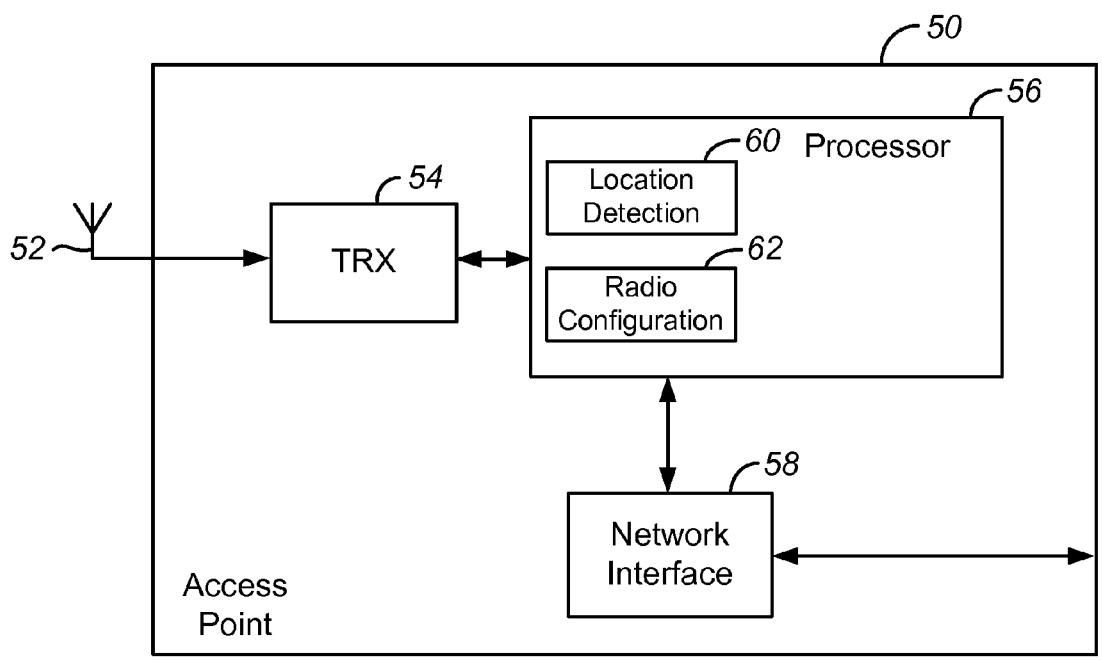
FIG. 2 illustrates a cellular base station in accordance with an embodiment of the invention.

FIG. 2 is a block schematic diagram, illustrating in general terms the form of an access point in accordance with an embodiment of the invention.

Thus, FIG. 2 shows an access point 50, which is generally conventional, and thus is described here only so far as is necessary for an understanding of the present invention. The access point 50 has an antenna 52, connected to transceiver (TRX) circuitry 54, which performs the required modulation and demodulation of the radio frequency signals for the cellular communications protocol used by the access point.

The TRX circuitry is connected to a processor 56, which performs the required control functions for the access point, including a location detection block 60 and a radio configuration block 62. The processor 56 is also connected to a network interface 58, which allows the access point 50 to connect over an IP network such as a local area network (LAN) and into a wide area network (WAN). The processor 56 runs software for performing the various procedures described herein.

Figure 3:
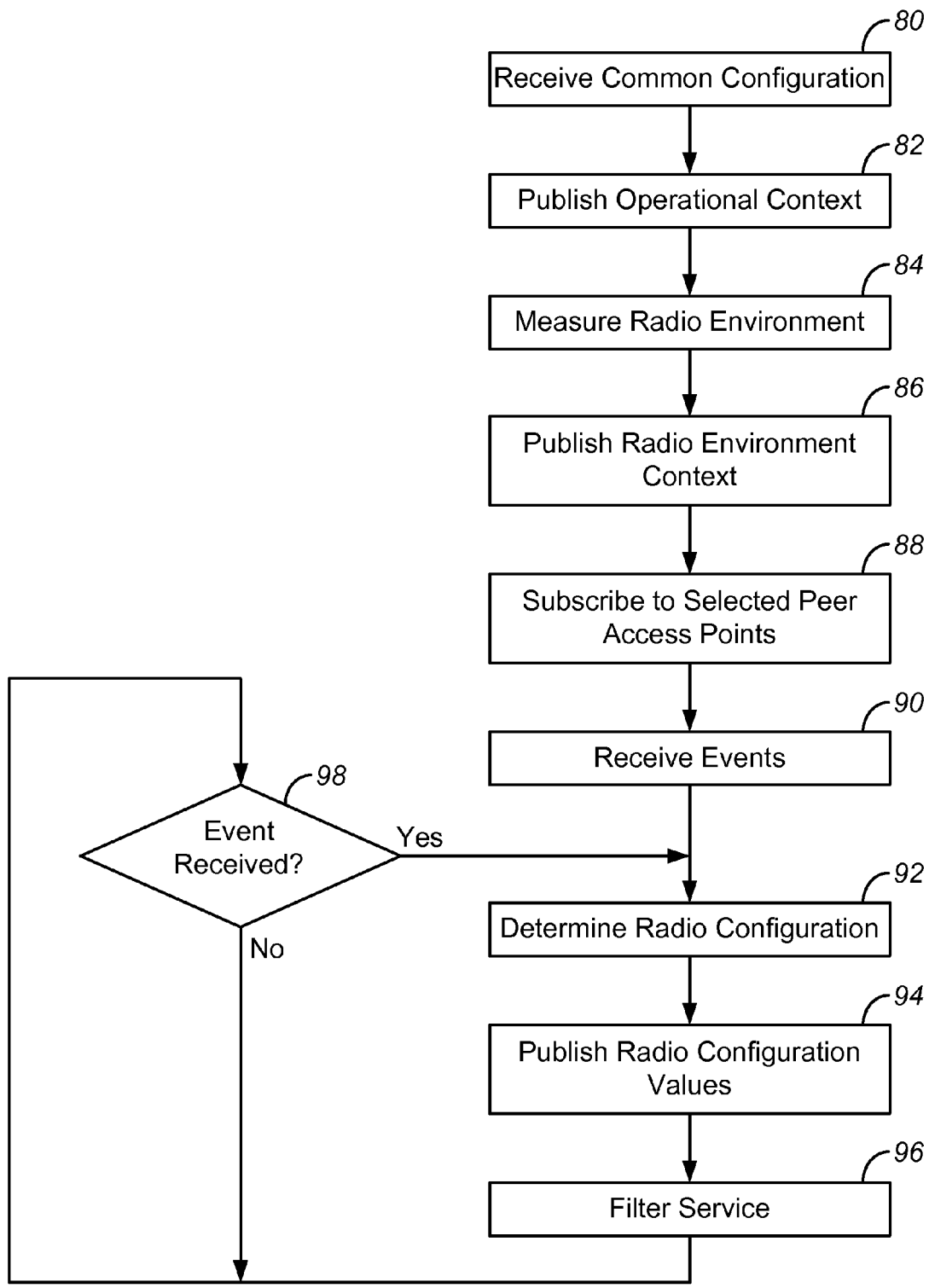
FIG. 3 is a flow chart illustrating a method in accordance with the invention.

FIG. 3 is a flow chart, illustrating a procedure performed in accordance with an aspect of the present invention. In one illustrative embodiment, described purely by way of example, the procedure is performed in a femtocell access point (also known as a Home NodeBs in 3GPP standards). More specifically, the procedure of FIG. 3 relates to a situation in which a group of femtocells is deployed to cover an area. This may be an area in a larger commercial building or outdoors. However, the configuration process described herein is sufficiently scalable that the procedure is equally applicable to a very large deployment of small cells, for example across a city or region.

Costs are reduced when planning, managing and operating a group of femtocells as a network if they can autonomously and collectively configure how they share the available radio spectrum, and can autonomously provide inter-femtocell mobility to UE devices. As is conventional, the femtocell access points of the group are all connected to a public Wide Area Network (WAN), specifically the internet, enabling communication between each access point and other resources that are accessible over the internet.

Figure 4:
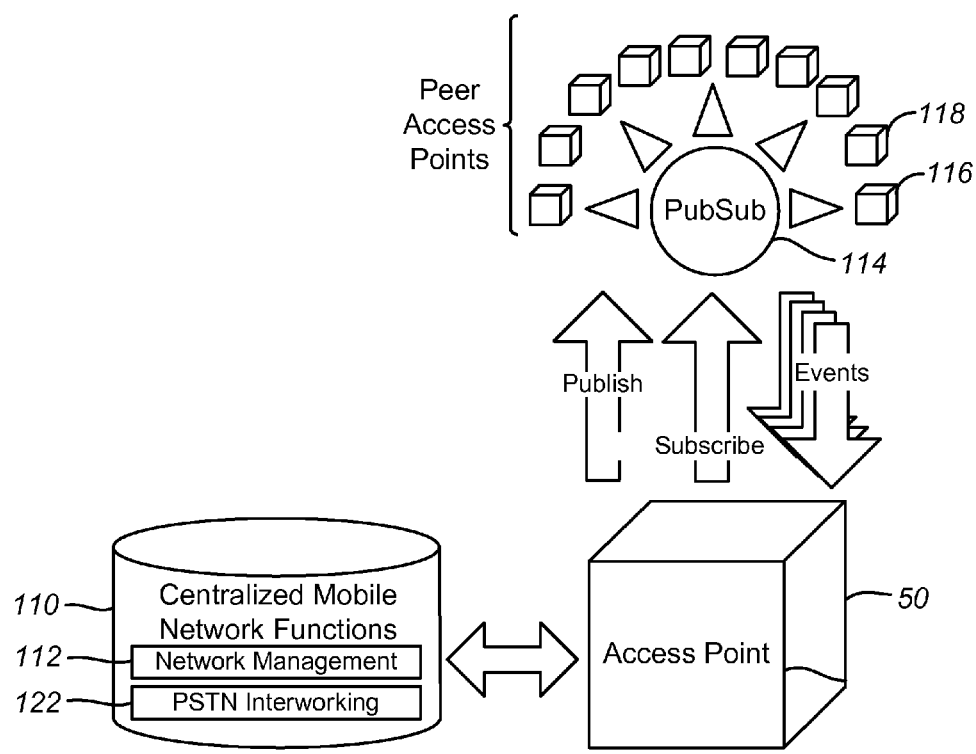
FIG. 4 schematically illustrates the operation of the cellular base station in accordance with the method of FIG. 3.

Specifically, FIG. 3 illustrates a procedure performed when there is an existing group of femtocells operating as a network, and a new access point is added to the network, in order that it can come into service and provide connectivity to mobile UEs. It should be noted that the actual sequence of steps in a concrete implementation may vary as access points are independent computational units exchanging asynchronous messages. FIG. 4 illustrates the access point 50 establishing a connection to the centralized functions 110 of the mobile network.

The process begins with step 80, when the access point is first powered on. In step 80, the access point receives a common configuration from a network management function (shown as block 112 in FIG. 4), which typically will be centralized, so that it provisions multiple groups of access points throughout the network. For reasons of efficiency, it is preferable that exactly the same initial configuration data is provisioned to every access point. The initial configuration data might be provided on the access point 50 at manufacture, or the access point 50 might instead be provided with a URL identifying a suitable server from which the initial configuration data might be downloaded to the access point 80 on start up.

In one example, the initial configuration data includes constraints, within which the autonomous radio configuration algorithms on the access point 50 must make their dynamic selections. In addition, the initial configuration data in this example includes values to be looked up later (i.e. DNS lookups).

In step 82, the access point publishes values defining its operational context. The values are published using a publish-subscribe mechanism, whereby the access point 50 makes no attempt to identify specific receivers of the information, but simply publishes the information to a publish-subscribe server 114, which is hosted on the public internet, accessible by all of the access points over the IP network, as shown in FIG. 4, and which provides message broker, forwarding and repeater functionality. While publishing the information, an access point characterizes the message into one of several available classes. For example, in this case, the message might be allocated to a class of messages that all provide updates to the operational context of an access point.

Publish-subscribe, or PubSub, is an accepted design pattern within the Internet development community, most notably implemented as a extension of the XMPP protocol (http://xmpp.org/extensions/xep-0060.html). PubSub improves scalability of information exchange by decoupling the relationship between senders and receivers. With PubSub, the publisher of information does not know about the subscribers that will receive the message, and the subscribers register their interest in certain classes of message ahead of time. The publisher sends a message to the PubSub service, and the PubSub service distributes a copy of the message to each interested subscriber.

Thus, the messaging traffic volumes scale approximately linearly with the number of access points, rather than exponentially, as messages from access points are routed only to the other access points that are interested, and not to every other peer.

The set of values defining the operational context of the access point is extensible. For example, in this embodiment, the access point 50 includes a location detection block 60. For example, the location detection block 60 might receive input signals from a GPS, or other satellite positioning system, receiver, and calculate the location of the access point from the received signals. Alternatively, the location detection block 60 might control the transceiver circuitry 54 of the access point 50 to detect signals from other access points or from other radio sources, and can then determine the location of the access point by triangulation in the received signals.

As another example, the operational context of the access point might include the maximum power at which it is physically capable of transmitting. The operational context might also include the assigned IP network address or addresses of the access point. In addition, if the access point is part of a group of access points within an enterprise, for example, this group identity might also be part of the operational contect that can be shared with other access points.

In step 84, the access point takes measurements of its radio environment. For example, the access point 50 detects signals from neighbouring access points, and from any macrocells that are able to provide coverage at that location. Having detected the signals, the access point 50 is able to identify the cells transmitting those signals by the Cell-ID that they broadcast, and is also able to detect the strengths of such signals. This information forms the radio environment context within which the access point 50 is operating.

In step 86, the access point publishes the information defining the radio environment context to the publish-subscribe site 114 as shown in FIG. 4.

When information is published to the publish-subscribe site 114, the publish-subscribe service propagates the information defining the access point's operational context and/or radio environment context as events to those of its peers (shown as 116, 118 etc in FIG. 4) that have subscribed. As described in more detail below, the peer access points 116, 118, . . . then make any necessary adjustments to their configuration so as to accommodate the addition of the new access point.

In step 88, the access point 50 subscribes through the publish-subscribe site 114 to those peer access points in its proximity that are close enough that it may need either to negotiate non-interfering radio configurations with those access points, or to exchange mobility control signalling with those access points to effect the handover of a UE.

Then, in step 90, the access point receives (as events from the publish-subscribe service 114) the operational context and radio configuration last published by each of the peers to which it has subscribed.

In step 92, the access point 50 determines its own radio configuration by means of its autonomous radio configuration block 62 shown in FIG. 2. More specifically, it applies an algorithm which combines the constraints from its initial configuration data with the configurations of its peers that it received in step 90, and the measurement data relating to the radio environment that it obtained in step 84. Based on these inputs, the access point decides upon a part of the radio spectrum and a transmit power to use. As noted above, the access point might be able to select an operating frequency and/or a scrambling code and/or a timeslot for its transmissions, depending on the radio access method used in the network.

Then, in step 94, the access point 50 publishes (to the publish-subscribe service 114) values defining its radio configuration. The PubSub service then propagates these values as events to those of the peer access points that have subscribed, enabling them to make any adjustments to their configuration as necessary to accommodate the addition of the new access point.

The access point has now completed all of the PubSub interactions required for it to enter service in step 96. Specifically, the access point 50 provides service to UEs within its radio coverage area, and interacts with centralized mobile network functions to authenticate UEs and to place calls to and from the PSTN through the PSTN interworking function 122 of the network. As part of this service, the access point 50 will typically receive measurement reports from any UEs connected thereto. If these measurement reports suggest that a handover might be required, the access point 50 is able to engage in direct communication with peer access points over the LAN, or other IP network, to effect the handover.

While in service, the access point 50 continually determines in step 98 whether it has received any events from the PubSub service containing updated operational context or radio configuration from peers to which it is subscribed. On receipt of such an event, the process returns to step 92, in which the access point repeats the determination of its radio configuration, in order to resolve any potential for radio interference which has been introduced. If any change is made, the access point 50 publishes the new radio configuration in step 94 as described above.

Thus, the access point 50 is able to obtain the information that it requires to set its configuration, in a manner that is highly scalable, remaining efficient even if there are a large number of access points in the group.

In step 88, it was mentioned that the access point must determine which subset of the whole collection of its peers are neighbours whose operational context and radio configuration it requires. There are at least two ways in which this can be done. As a first example, the network management function 112 may provision a neighbour list in step 80, based on information as to the location in which each access point is intended to be deployed, and a manual determination as to which access points are then potential neighbours. The publish-subscribe service 114 can then operate such that each access point receives the radio configuration update messages from its designated neighbours.

As a second example, an adjunct of the PubSub service can act as a Geospatial Radio Coverage Registry, subscribing to all access points to receive information about their locations and their maximum transmit powers (published in step 82).

Figure 5:
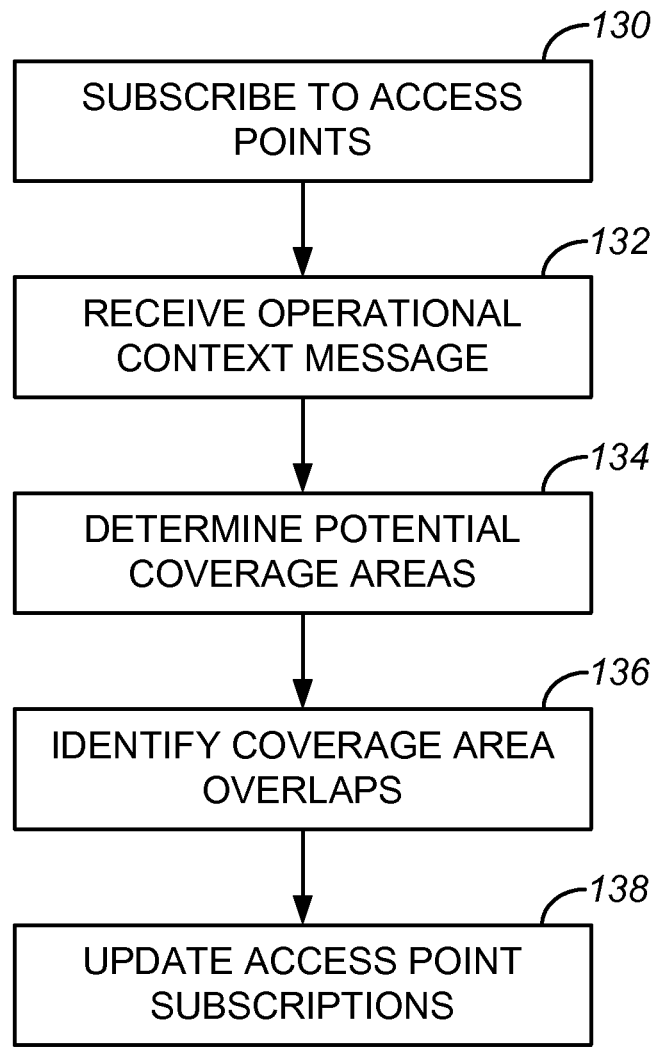
FIG. 5 is a flow chart illustrating the operation of the Geospatial Radio Coverage Registry.

FIG. 5 is a flow chart, illustrating the operation of the Geospatial Radio Coverage Registry. In step 130, the Geospatial Radio Coverage Registry subscribes to each access point. It has access to a database that stores details of all of the access points, and so it is able to ensure that it subscribes to any access point that is added to the network. In step 132, the Geospatial Radio Coverage Registry receives the initial operational context message from each access point, specifically identifying the location of that access point and the maximum power with which it can transmit. Based on this information, in step 134 the Geospatial Radio Coverage Registry is able to determine the potential coverage areas of each access point.

In its simplest embodiment, the Geospatial Radio Coverage Registry determines that the coverage areas of two access points overlap based on a simple calculation of a maximum distance over which the access point can transmit, derived from the maximum power with which it can transmit. Combining this with the location of that access point provides a potential coverage area, and it is straightforward to determine when the potential coverage areas of two access points overlap.

In an alternative embodiment, the Geospatial Radio Coverage Registry determines the coverage area of each access point based on a more detailed calculation that takes account of the terrain in which the access point is situated.

For example, the presence of a hill or a tall building might mean that the coverage area of an access point is less than the potential coverage area that its maximum transmit power would suggest. Alternatively, if the access point is located at the top of a hill its coverage area might actually be larger than its maximum transmit power would suggest. Thus, in step 134, the determination of the potential coverage areas can be performed in an accurate manner that takes account of these factors, or can be performed in a less accurate manner relying only on the location of the access point, and its transmit power.

In either case, the Geospatial Radio Coverage Registry, is then able in step 136 to identify when the potential coverage areas of two access points overlap, and hence that the two access points are capable of transmitting signals that can be detected at the same point.

When it is determined in step 136 that the coverage areas of two access points overlap, the Geospatial Radio Coverage Registry can identify that the two access points should receive radio configuration update messages from each other. Each access point subscribes to the Geospatial Radio Coverage Registry on initialisation, and so, when the Geospatial Radio Coverage Registry identifies that two access points should receive radio configuration update messages from each other, it notifies each of the access points that it should subscribe to messages from the other, and the subscriptions are updated in step 138.

In other embodiments, the Geospatial Radio Coverage Registry can identify that the two access points should receive radio configuration update messages from each other when an alternative proximity criterion is met.

For example, when an access point has the capability to detect signals transmitted on system downlink frequencies by other access points, it can list those access points whose transmissions it can detect, as its neighbours. In one embodiment, the Geospatial Radio Coverage Registry can identify that the two access points should receive radio configuration update messages from each other when they are neighbours according to this definition, or when they have at least one neighbour in common.

Thereafter, each access point receives events relating to any radio configuration updates from any of the peer access points in its proximity that might affect its own radio configuration. Thus, in step 92, the access point 50 determines its radio configuration.

In one embodiment the access point makes a deterministic decision in isolation on the basis of the constraints it received in step 80, together with the configurations of peers it received in step 90 and its measured radio environment. It makes its best effort to avoid choosing a configuration which conflicts with a neighbour's settings and might cause interference, but, if such a conflict is unavoidable, the access point will go ahead, and will leave the peer to resolve the situation when it subsequently receives an event notifying it of the new configuration and reconsiders its own radio configuration in the light of that.

This may cause several access points to need to alter their configurations as the effects pass to the neighbours of the neighbours of the first access point.

As an alternative, the access point can determine its configuration as described above but, if it determines that it cannot avoid a conflicting configuration, it exchanges direct messages with the affected peer to resolve the conflict before proceeding. Again, there may be knock-on conflicts with neighbours of that peer, in which case all affected peers can negotiate a mutually satisfactory set of radio configurations before finalising them in parallel.

It can be difficult to design sequential or parallel algorithms executed at each access point which guarantee to converge at a stable and near-optimal radio configuration for the network. Therefore, as an alternative to the above, a specialised client of the PubSub service may act as a controller to co-ordinate radio configuration decisions. For example, this client may determine, based on the location of an access point, that it is only able to operate on certain frequencies, so that any conflicts are localised. This may be implemented as a function of the Geospatial Radio Coverage Registry or as an additional specialised client of the PubSub service.

It has been mentioned above that, in some situations, it is useful for there to be direct IP communication paths between access points. However, access points are often behind Network address translation (NATs).

In order to allow IP packet routing between access points in this case, the assigned IP network addresses published (to the PubSub service) may be routable from other peers, in which case they are sufficient. For example, this would apply if, within the centralized mobile network functions 110, there is a security gateway or IP relay assigning mutually-routable addresses to the access points.

As an alternative, NAT traversal technology can be used to determine routes between access points on a pairwise basis as needed, for example the Jingle extension of the XMPP protocol (http://xmpp.org/extensions/xep-0166.html).

The process described above was concerned with the situation where a new access point is added to the network. However, there are other situations in which the use of the PubSub service provides advantages.

As one example, once they are in service, access points may undertake relatively frequent collaborative radio transmit power reconfiguration to resolve dynamic issues with UE service. For example, when too many UEs are attached to one access point that access point may shrink its coverage area while its neighbours expand theirs, so that they can take some of the UEs from the congested access point, providing better service overall. As another example, UE mobility between access points depends upon zones of overlapping coverage in order to allow handovers to be made successfully. If two access points experience repeated dropped calls on handover between them, then one or both may increase their transmit power in an effort to expand the region of overlapping coverage.

When it is determined for one of these reasons (or any other reason) that an access point should alter its transmit power, changes are propagated between peers using the mechanism described above, whereby each access point publishes its changed transmit power, and any other access point that has subscribed to that event will receive the message. As an alternative, the decision making process to determine new transmit power values may be made between access points sequentially, in parallel or with assistance from a mediator.

In addition, access points may use the publish-subscribe mechanism to publish data for consumption by specialist subscribers which are not peer access points. For example, technicians can monitor the status of each access point, in order to be able to detect any problems with the network. For example, the technicians can monitor the numbers of UEs being served by each access point, and can receive faults and alarms, statistics about dropped calls, and warnings if the radio configuration algorithms can only make choices that risk causing interference. In addition, the technicians can receive statistics about user paths through the network of access points. In the case of shopping malls or the like, this information can be used not only to improve the cellular radio network, but can also be used for planning the layout of the mall itself.

Thus, it is described how the publish-subscribe mechanism can be applied to enable a group of cellular access points to self-configure and hence provide autonomous UE mobility.

The invention claimed is:

1. A method of configuring an access point, the method comprising:
   transmitting, from the access point, operational context information for the access point to a server according to a publish-subscribe messaging pattern;
   receiving, at the access point, information identifying at least one other access point meeting proximity criteria;
   subscribing to publish-subscribe messages from the server for the or each other access point identified in said information; and
   setting radio configuration information for the access point in view of the received messages from the or each other access point.

2. A method as claimed in claim 1, further comprising transmitting said radio configuration information as part of the operational context information for the access point.

3. A method as claimed in claim 1, wherein the operational context information for the access point comprises location information and information relating to a maximum transmit power of the access point.

4. A method as claimed in claim 1, wherein the operational context information for the access point comprises information identifying any other access points whose transmissions can be detected by the access point.

5. An access point, configured to operate in accordance with the method as claimed in claim 1.

6. A computer program product, comprising computer readable code for causing a processor to operate in accordance with the method as claimed in claim 1.

* * * * *